US012578709B2

(12) United States Patent
Lang et al.

(10) Patent No.: US 12,578,709 B2
(45) Date of Patent: Mar. 17, 2026

(54) DEVICE AND METHOD FOR OPTIMISING THE PROCESS TIME OF A PRODUCTION MACHINE

(71) Applicant: KIEFEL GMBH, Freilassing (DE)

(72) Inventors: Christian Lang, Haigermoos (AT); Michael Schörghofer, Bad Dürrnberg (AT); Peter Knoll, Ainring (DE); Andreas Ainz, Plainfeld (AT); Horst Hradetz, Ainring/Mitterfelden (DE)

(73) Assignee: KIEFEL GMBH, Freilassing (DE)

( * ) Notice: Subject to any disclaimer, the term of this patent is extended or adjusted under 35 U.S.C. 154(b) by 801 days.

(21) Appl. No.: 17/621,488

(22) PCT Filed: Jun. 22, 2020

(86) PCT No.: PCT/DE2020/000136
§ 371 (c)(1),
(2) Date: Aug. 16, 2022

(87) PCT Pub. No.: WO2020/259728
PCT Pub. Date: Dec. 30, 2020

(65) Prior Publication Data
US 2023/0221705 A1 Jul. 13, 2023

(30) Foreign Application Priority Data
Jun. 25, 2019 (DE) ..................... 10 2019 117 097.4

(51) Int. Cl.
*G05B 19/418* (2006.01)
(52) U.S. Cl.
CPC .................. *G05B 19/41865* (2013.01); *G05B 2219/32015* (2013.01); *G05B 2219/32128* (2013.01); *G05B 2219/40161* (2013.01)

(58) Field of Classification Search
None
See application file for complete search history.

(56) References Cited

U.S. PATENT DOCUMENTS

| 5,880,960 A * | 3/1999 | Lin ......................... G06F 17/11 |
| | | 700/99 |
| 6,438,436 B1 * | 8/2002 | Hohkibara ............. G06Q 10/06 |
| | | 700/99 |

(Continued)

FOREIGN PATENT DOCUMENTS

| CN | 101813936 A | 8/2010 |
| CN | 104054032 | 9/2014 |

(Continued)

OTHER PUBLICATIONS

Office Action for corresponding CN 202080046433.4 issued May 25, 2023.

(Continued)

*Primary Examiner* — Jason Lin
(74) *Attorney, Agent, or Firm* — Tarolli, Sundheim, Covell & Tummino LLP

(57) ABSTRACT

The invention relates to a production machine with a control program for visualizing stations and/or machine components, highlighting the speed-determining station and/or the speed-determining machine component in order to optimize the process time. The invention also relates to a method of optimizing the process time for a production machine with such a control program and to a data carrier with such a control program.

15 Claims, 5 Drawing Sheets

(56) References Cited

U.S. PATENT DOCUMENTS

| | | | | |
|---|---|---|---|---|
| 6,519,498 | B1 * | 2/2003 | Jevtic | G05B 19/41865 700/100 |
| 6,631,305 | B2 * | 10/2003 | Newmark | G05B 19/41805 700/110 |
| 6,801,819 | B1 * | 10/2004 | Barto | G06Q 10/06 700/121 |
| 6,904,329 | B1 * | 6/2005 | Barto | G05B 19/41865 700/99 |
| 7,715,936 | B2 * | 5/2010 | Thierauf | G06Q 10/04 700/99 |
| 8,423,168 | B2 * | 4/2013 | Nonaka | G05B 19/4184 700/99 |
| 10,191,792 | B2 * | 1/2019 | Qi | G06F 11/0754 |
| 10,672,086 | B2 * | 6/2020 | Murata | G06Q 10/1097 |
| 10,925,201 | B2 * | 2/2021 | Kobayashi | H05K 13/0882 |
| 11,029,674 | B2 * | 6/2021 | Matsuyama | G05B 23/0208 |
| 2004/0225484 | A1 | 11/2004 | Hamann | |
| 2006/0271225 | A1 * | 11/2006 | Schulze | G05B 13/048 700/121 |
| 2017/0364843 | A1 * | 12/2017 | Haligowski | G06Q 10/0633 |
| 2019/0049938 | A1 * | 2/2019 | Ikeda | G05B 19/41875 |

FOREIGN PATENT DOCUMENTS

| | | |
|---|---|---|
| CN | 109313739 A | 2/2019 |
| EP | 3 038 442 A1 | 6/2016 |
| EP | 3 383 159 A1 | 10/2018 |
| WO | 2012/171513 A | 12/2012 |
| WO | 2013/143801 A | 10/2013 |
| WO | 20180146772 A1 | 8/2018 |

OTHER PUBLICATIONS

International Search Report and Written Opinion for corresponding PCT Patent Application No. PCT/DE2020/000136 dated Oct. 1, 2020.

* cited by examiner

DEVICE AND METHOD FOR OPTIMISING THE PROCESS TIME OF A PRODUCTION MACHINE

RELATED APPLICATIONS

The present invention is a U.S. National Stage under 35 USC 371 patent application, claiming priority to Serial No. PCT/DE2020/000136, filed on Jun. 22, 2020; which claims priority from German Patent Application No. 10 2019 117 097.4 filed on Jun. 25, 2019; the entirety of which is hereby incorporated herein by reference.

FIELD OF THE INVENTION

The invention relates to a production machine having a control program for visualizing stations and/or machine components while highlighting the speed-determining station and/or the speed-determining machine component for optimizing the process time. The invention also relates to a method of optimizing the process time for a production machine with such a control program and to a data carrier with such a control program.

BACKGROUND OF THE INVENTION

Production machines with several stations are used in many areas of manufacturing. These stations usually consist of several subassemblies using product-specific tools. In plastics processing, for example, blow molding stations or thermoforming stations are used as primary forming stations. Further stations within a production machine can be a punching machine, a hole punching machine or a stacking machine. The actual production process is defined by process parameters which, as machine-wide parameters, control the cooperation of the various stations or, within a station, the work processes of the individual components and tools. These process parameters in their entirety define the (usually cyclical) process sequence and thus form a production program, which is also referred to as a recipe.

In the prior art, methods and devices for visualizing the production program as a flow chart are known. Here, the process sequence is displayed schematically, indicating the stations or assemblies/tools involved, with the individual process steps assigned to the components or tools plotted as bars over time.

On the one hand, the production program should permit the manufacture of a high-quality product in a reproducible manner; on the other hand, it should also minimize production time. In the case of complex production programs with many components/tools and possibly several stations, it is extremely difficult for the operator to identify the speed-determining process sequences, especially since individual process steps with the assemblies/tools involved not only run consecutively, but in part also in parallel or in an overlapping manner. In addition, other process times such as delay time, travel time or derivative time are present as parameterizing time phases in addition to the actual effective time. In addition, releases are usually defined in order to take critical process interfaces into account. Despite schematic visualization by means of a flow chart, the person skilled in the art therefore has no objective basis for time optimization of the process program and thus of the manufacturing process. He must rely on his individual experience and try to optimize the process in terms of process time in a trial-and-error approach, which usually also requires initialization of the production machine.

It would therefore be desirable to put the time optimization of the process flow on a more objective basis and to provide a process visualization to the user, with which he can more quickly arrive at a process parameter set that is improved in terms of time for the production, regardless of his experience.

SUMMARY OF THE INVENTION

The invention is based on the task of providing a control program for production machines, with which the temporal optimization of the process parameter set takes place on a more objective basis and a process visualization is made available to the user, with which he can arrive in a targeted manner, and thus more quickly, at a process parameter set that is improved in terms of time for the production, regardless of his experience.

The task of the invention is solved by a production machine according to claim 1 and a method according to claim 9. Further advantageous embodiments of the production machine are the subject matter of dependent claims 2 to 8. Further advantageous embodiments of the method are the subject matter of dependent claims 10-15.

In a first aspect, the invention relates to a production machine comprising one or more stations (2), each comprising a plurality of machine components (3), and a machine controller (4) for controlling the production machine (1) comprising a control program (5) with a visualization unit (6), wherein the control program (5) is designed to display the stations and/or the machine components of a station as a flow chart on the visualization unit (6) and to highlight the speed-determining station and/or the speed-determining machine component.

Production machines for plastics processing can be, for instance, blow molding machines or thermoforming machines. Blow molding machines produce a film tubing from heated plastic material. Thermoforming machines are used for producing deep-drawn moldings, comprising a transport unit for a thermoplastic film web and a molding station for molding the moldings from the previously heated film web. Such machines are characterized in that they comprise a plurality of individual machine components which must suitably work together since a single film tubing or a single film web, respectively, are guided through the entire production facility and consequently the machine components must be well matched in effect and cycle time so as to achieve a good overall process. Machine components for a thermoforming machine comprise, for instance, the transport unit for film feed from a film roll, a preheating station for preheating the film web, a heating station for heating the film web up to the process temperature, a molding station for molding the product from the film web, a cutting station for cutting the molded products out of the film web, a stacking station for stacking the finished products and a recovery station for the film web which has not been processed.

The machine controller can be arranged on the production machine or separately from the production machine, the machine controller being connected to the respective machine components via suitable data lines such that the process parameter inputs can be translated into corresponding machine settings. The machine control additionally comprises a processor on which the control program can be installed and executed as well as a data memory for storing process parameters or is at least connected to such a memory. The data lines can be embodied as data cables or wireless. The machine controller can also be implemented, for example, as a cloud solution which is connected to the production machine via W-LAN or an Internet connection.

Stations in the sense of the invention are functionally connected individual machines of the overall machines. Examples here are a stacking machine or a punching machine. The components of these stations are referred to as machine components. For example, if the production machine is a thermoforming machine, the station "moulding station" comprises as machine components an upper die and a lower die between which the film web is clamped for the moulding process and, if necessary, prestretching dies which pre-stretch the film during the moulding process.

In a further embodiment of the invention, the speed-determining station and/or the speed-determining machine component are highlighted in the production machine by means of one or more of the visualization types 1 to 5 listed below:

Visualization type 1: with this visualization type, a line running perpendicular to the t-axis of the flow chart is displayed in the flow chart, which intersects the bar of the speed-determining station or the speed-determining machine component at the t-value at which the process bar of this station or this machine component ends in the flow chart. This has the advantage that the user sees at first glance the temporal embedding of the speed-determining station/machine component in the overall process and can thus more easily take measures for process optimization.

Visualization type 2: with this visualization type, links that already exist in the flow chart are visually highlighted, such as a pointer that links the end of a first speed-determining process step with the start of a second process step and defines a release. In this way, the procedural embedding in the overall process is also immediately apparent to the user.

Visualization type 2: with this visualization type, the delay time is indicated numerically. This gives the user an immediate indication of the maximum time that can be saved by adapting the process.

Visualization type 3: with this visualization type, the name of the speed-determining station or the speed-determining step is displayed in a signal colour such as yellow, orange or red. This not only allows immediate identification of the relevant speed-determining station or machine component, but also reduces the risk of misinterpretation with subsequent incorrect operation.

Visualization type 3: with this visualization type, the speed-determining station or the speed-determining step is linked to a graphic symbol, such as a dial with hands. Symbols of this kind have the advantage that they provide an intuitive grasp of the facts and can also be used internationally.

In a further embodiment, the control program of the production machine according to the invention is additionally designed to display the time phases of the process sequences carried out by the machine component on the visualization device. In the context of the present application, a time phase is defined as a period of time in which a specific process is carried out by a machine component or station. It thus has a defined beginning and a defined end, which thus define a phase length.

The visualization of the time phases is preferably done by a line-by-line arrangement of the machine components with the time axis as the horizontal axis and a presentation of the time phases as visually distinguishable sections of a time beam in the line of the respective machine component. Such a representation of the time phases as sections of a time beam expediently takes the form of a bar graph.

Usefully, the time phases are assigned to a specific time phase type according to the assigned process step. Non-restrictive examples of such time phase types are active time, delay time, travel time and derivative time. For example, the active time describes the time phase in which a machine component acts on the workpiece to be processed, whereas the travel time is the time in which the machine component is moved towards or away from the workpiece.

In a preferred embodiment of the invention, the visualization unit of the production machine is set up as an interactive user interface. In this case, a design as a touch-screen is preferred.

In one embodiment of the invention, the control program of the production machine is additionally designed to provide a user aid on the visualization unit, which can preferably be opened by touching/clicking on the visual highlights of the speed-determining station or the speed-determining machine component. It is particularly preferred that the user aid contains suggestions for optimizing the timing of the process. In this case, it is preferable that the user aid is designed as a separate program window that opens when the user calls it up within the existing program window ("pop-up menu").

In a particular embodiment, the control program (5) of the production machine (1) is additionally designed to display switch panels (13) on the visualization device (6) for entering time values for the time phases of the process sequences carried out by the machine component. According to the invention, a switch panel is defined to be an input area of a user interface in which one or more time values can be entered.

Preferably, one or more of the following visualization types are provided for the switch panel:

The switch panels are displayed in a separate window which, as a context menu, thus allows the comprehensive input of time values for the selected station or machine component.

The switch panels of a machine component are arranged in the corresponding line of the machine component. This allows intuitive assignment and an easy input of values.

The sequence of the switch panels within a line corresponds to the sequence of the controllable time phases of the machine component. This also allows intuitive and error-free use.

The switch panels are grouped in columns according to time phase types and are thus arranged in a particularly clear manner.

The switch panels are shown in the same colours as the time phase types of the flow chart.

The switch panels are each provided with or linked to an indication of the respective time unit, such as seconds, minutes or hours, so that the user is informed at first glance about the time unit present here.

The switch panels are each provided with or linked to a time value suggested by the control program. This gives the user a concrete suggestion for optimizing the program, which he only has to accept for transfer into the control program.

The switch panels are each provided with or linked to a limit value for the smallest possible time value. This allows the user to see at first glance the minimum time to which he can reduce this process step. Alternatively, a selection of different time values can be presented here, corresponding, for example, to a minimum time, a medium time reduction and a slight time reduction.

The switch panels are each provided with or linked to different optimization strategies which propose, for example, a maximum time reduction, a medium time reduction or a slight time reduction as alternatives and enable automatic recalculation of the program after selection of an optimization strategy, even without precise user input of values.

The switch panels are each provided with or linked to a range of possible time values. This allows the user to see at first glance the range of values in which he can move.

For the speed-determining machine component, the switch panel(s) whose time values must preferably be shortened for a time reduction of the machine component sequence is/are visually highlighted. This allows the user to focus directly on the relevant switch panels and change them in a targeted manner.

In a further embodiment, the control program of the production machine according to the invention is additionally designed to display a new flow chart based on one or more new time values after they have been entered and transferred to the control program on the visualization device. This provides the user with direct feedback on the effects of the new time values selected and entered by him.

In a further embodiment, in the production machine according to the invention, the control program provides a separate visualization page on the visualization unit for each visualized station, with suitable buttons being provided for switching between individual station visualization pages. A button in the sense of the invention is defined to be an area of the user interface which triggers a program command by touching or clicking/double-clicking by means of a cursor.

In a preferred embodiment of the invention, in the production machine, the control program is designed in such a way that the recalculation of the production program and the visualization of the speed-determining station and/or the speed-determining machine component based on input of new time values into the respective switch panels can be performed without real operation of the production machine. This offers an enormous advantage, as a time-consuming, cost-intensive (possibly even material-consuming) initiation of the machine can be dispensed with.

In a second aspect, the invention provides a method of optimizing the process time for a production machine, wherein the production machine comprises a plurality of stations and/or machine components and a machine controller for controlling the production machine and further comprises a control program with an interactive user interface designed as a visualization unit, preferably a touchscreen, wherein the method comprises the following steps:

(A) visualizing at least one, preferably all, stations and/or machine components as a flow chart highlighting the speed-determining station and/or speed-determining machine component with indication of the time phases and providing corresponding switch panels for inputting time values with regard to the respectively visualized station or machine component into the control program;

(B) input of one or more time values into the switch panels and user release for transmission into the control program;

(C) calculating the production program in its time sequence based on the time value(s) entered via the switch panels in step (B);

(D) optionally repeating the visualization according to step (A) based on the newly calculated production program according to step (C), preferably iterating until a maximally shortened process time is achieved.

In a further embodiment of the invention, the process involves highlighting the speed-determining station and/or the speed-determining machine component by one or more of the visualization types 1 to 5 listed below:

Visualization type 1: in this visualization type, a line running perpendicular to the t-axis of the flow chart is displayed in the flow chart, which intersects the bar of the speed-determining station or speed-determining machine component at the t-value at which the process bar of this station or this machine component ends in the flow chart. This has the advantage that the user can see at first glance the temporal embedding of the speed-determining station/component in the overall process and can thus take measures for process optimization more easily.

Visualization type 2: with this visualization type, the visual highlighting of links that already exist in the flow chart, such as a pointer that links the end of a first speed-determining process step with the start of a second process step and defines a release, takes place. In this way, the procedural embedding in the overall process is also immediately apparent to the user.

Visualization type 2: with this visualization type, the delay time is indicated numerically. This gives the user an immediate indication of the maximum time that can be saved by adapting the process.

Visualization type 3: with this visualization type, the name of the speed-determining station or the speed-determining step is displayed in a signal colour such as yellow, orange or red. This not only allows immediate identification of the relevant speed-determining station or machine component, but also reduces the risk of misinterpretation with subsequent incorrect operation.

Visualization type 3: with this visualization type, the speed-determining station or the speed-determining step is linked to a graphic symbol, such as a dial with hands. Symbols of this kind have the advantage that they provide an intuitive grasp of the facts and can also be used internationally.

In a further embodiment, in the method according to the invention, the control program is additionally designed to display on the visualization unit the time phases of the process sequences carried out by the machine component.

This is preferably done by a line-by-line arrangement of the machine components with the time axis as the horizontal axis and a representation of the time phases as visually distinguishable sections of a time beam in the line of the respective machine component. Such a presentation of the time phases as sections of a time beam expediently takes the form of a bar graph.

It is convenient that the time phases are assigned to a specific time phase type according to the assigned process step. Non-restrictive examples of such time phase types are active time, delay time, travel time and derivative time.

In one embodiment of the invention, the control program of the production machine is additionally designed to provide a user aid on the visualization unit, which can preferably be opened by touching/clicking on the visual highlights of the speed-determining station or the speed-determining machine component, and the user aid particularly preferably contains suggestions for optimizing the timing of the process. Preferred here is a design as a separate program window which opens by the user calling it up within the existing program window ("popup menu").

In a particular embodiment, the control program of the production machine is additionally designed to display switch panels on the visualization unit for entering time values for the time phases of the process sequences carried out by the machine component. According to the invention, a switch panel is defined to be an input area of a user interface in which one or more time values can be entered.

In a preferred manner, one or more of the following visualization types are provided for the switch panel:

The switch panels are displayed in a separate window, which as a context menu thus allows the comprehensive entry of time values for the selected station or machine component.

The switch panels of a machine component are arranged in the corresponding line of the machine component. This allows intuitive assignment and easy input of values.

The sequence of the switch panels within a line corresponds to the sequence of the controllable time phases of the machine component. This also allows intuitive and error-free use.

The switch panels are grouped in columns according to time phase type and are thus arranged in a particularly clear manner.

The switch panels are shown in the same colours as the time phase types of the flow chart.

The switch panels are each provided with or linked to an indication of the respective time unit, such as seconds, minutes or hours, so that the user is informed at first glance about the time unit present here.

The switch panels are each provided with or linked to a time value suggested by the control program. This gives the user a concrete suggestion for optimizing the program, which he only has to accept for a transfer into the control program.

The switch panels are each provided with or linked to a limit value for the smallest possible time value. This allows the user to see at first glance the minimum time to which he can reduce this process step. Alternatively, a selection of different time values can be presented here, corresponding, for example, to a minimum time, a medium time reduction and a slight time reduction.

The switch panels are each provided with or linked to different optimization strategies which, for example, propose a maximum time reduction, a medium time reduction or a slight time reduction as alternatives and enable automatic recalculation of the program after selection of an optimization strategy, even without precise input of values by the user.

The switch panels are each provided with or linked to a range of possible time values. This allows the user to see at first glance the range of values in which he can move.

For the speed-determining machine component, the switch panel or switch panels whose time value(s) must preferably be shortened for a time reduction of the machine component sequence are visually highlighted. This allows the user to focus directly on the relevant switch panels and change them in a targeted manner.

In a further embodiment, in the method according to the invention, the control program is additionally designed to display a new flow chart based on one or more new time values after they have been entered and transferred to the control program on the visualization unit. This provides the user with direct feedback on the effects of the new time values selected and entered by him.

In a further embodiment, in the method according to the invention, the control program provides a separate visualization page on the visualization unit for each visualized station, with suitable buttons being provided for switching between individual station visualization pages.

In a preferred embodiment of the invention, in the method the control program is designed such that the recalculation of the production program and the visualization of the speed-determining station and/or the speed-determining machine component based on input of new time values into the respective switch panels can be performed without real operation of the production machine. This offers an enormous advantage, since a time-consuming, cost-intensive initialization of the machine (possibly even taking place with material consumption) can be dispensed with.

The invention further relates to a data carrier with a control program stored thereon suitable for carrying out the process according to the invention or for controlling a production machine according to the invention.

It is understood that features of the solutions described above or in the claims can also be combined, if necessary, in order to be able to implement the advantages and effects achievable in the present case in a correspondingly cumulative manner.

BRIEF DESCRIPTION OF THE FIGURES

In addition, further features, effects and advantages of the present invention are explained with reference to the accompanying drawing and the following specification. Components in the individual figures which at least essentially correspond in terms of their functions are marked here with the same reference numbers, where the components do not have to be numbered and explained in all figures.

The figures show.

EXAMPLES OF EMBODIMENT

Figure 1:
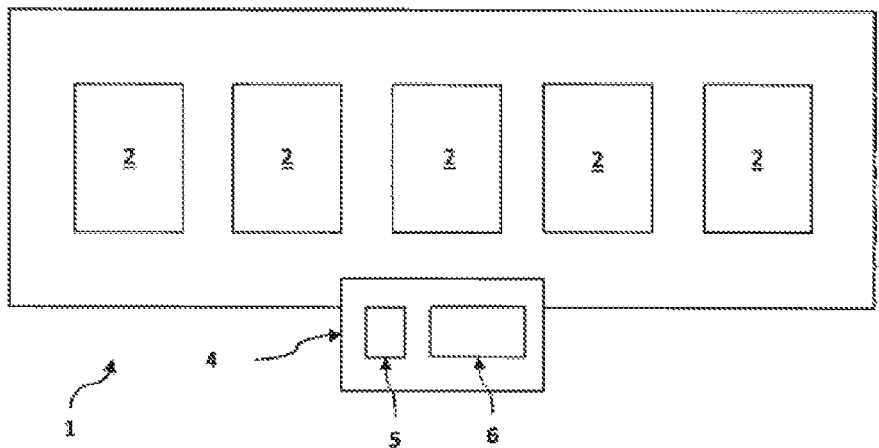
FIG. 1 a schematic presentation of the production machine according to the invention.

FIG. 1 shows a schematic presentation of the production machine 1 for plastics processing according to the invention, which comprises several stations 2 (here five stations such as, for example, a preheating station, a heating station, a molding station, a cutting station and a stacking station of a thermoforming machine for deep-drawing moldings from a heated plastic film web) and a machine controller 4 for controlling the plastics processing machine 1. The machine controller 4 comprises a control program 5 with a visualization unit 6, which is designed here as a touchscreen, wherein the control program 5 is designed to visualize on the visualization unit 6 at least one, preferably all, of the stations 2 (and/or machine components 3 not shown here) in their functions during production in a respective presentation for each of these machine components and to provide corresponding switch panels 13 for the input of time values in relation to the respectively visualized machine component 3. For details of the visualization unit 6, please refer to FIGS. 2 to 4. The control program 5 can be designed in such a way that the visualization of the stations 2 or machine components 3 in their functions during production and the input of process parameters into the respective switch panels 13 can be carried out without actual operation of the production machine 1. The control program 5 can provide a separate visualization page 15 on the visualization unit 5 for each visualized station 2, where suitable buttons 16 are provided for switching between individual visualization pages 15.

Figure 2:
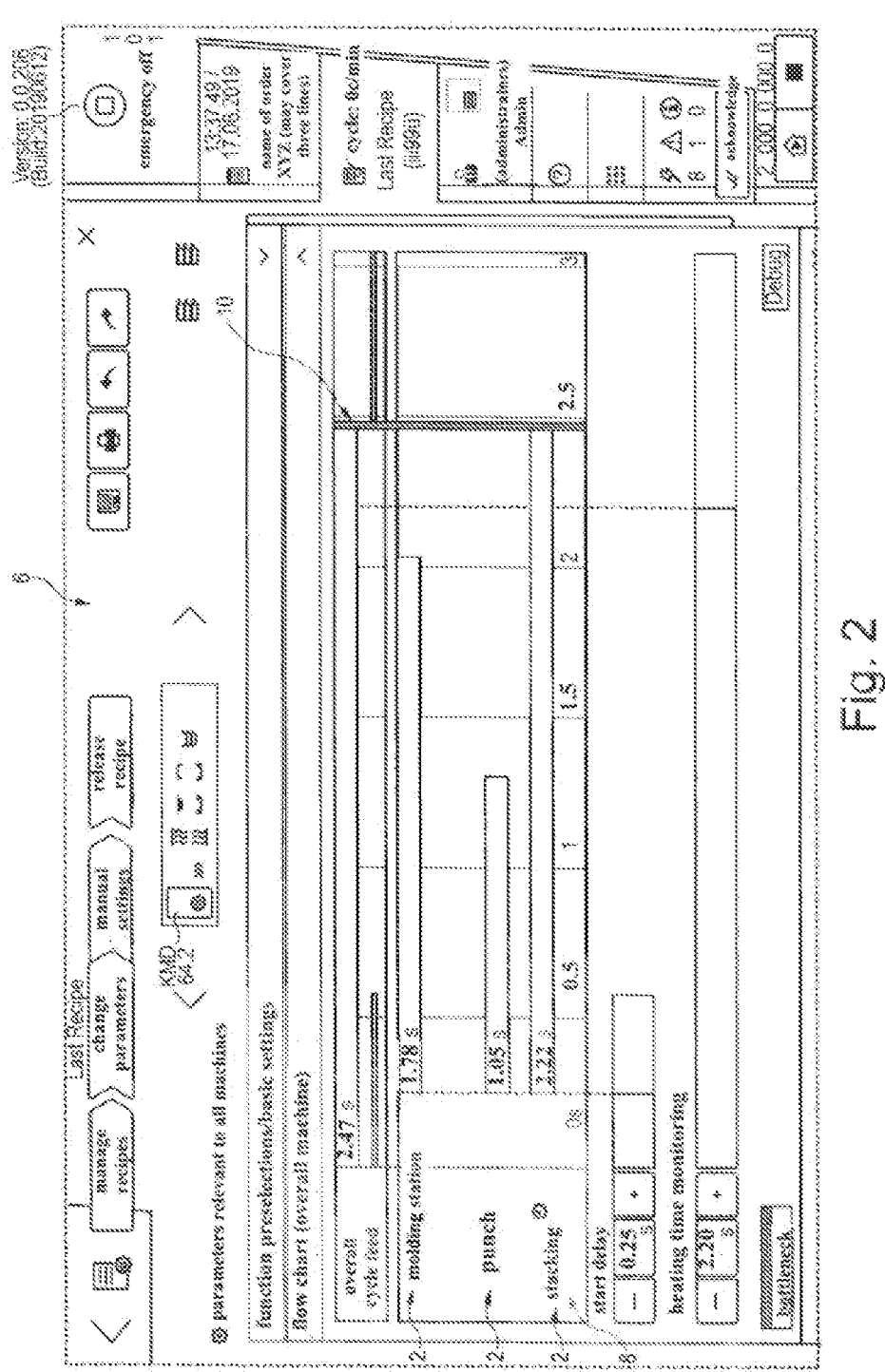
FIG. 2 an embodiment of the visualization of a station on the visualization unit with a highlighted speed-determining station according to the present invention.

FIG. 2 shows an embodiment of the invention by visualizing the stations 2 (here molding station, punch and stacking) on the visualization unit 6 including highlighting of the stacking station 8 as the speed-determining station. Here, the vertical line 10 additionally indicates where the stacking process ends as a bar in the flow chart and where the feed follows as the next process.

Figure 3:
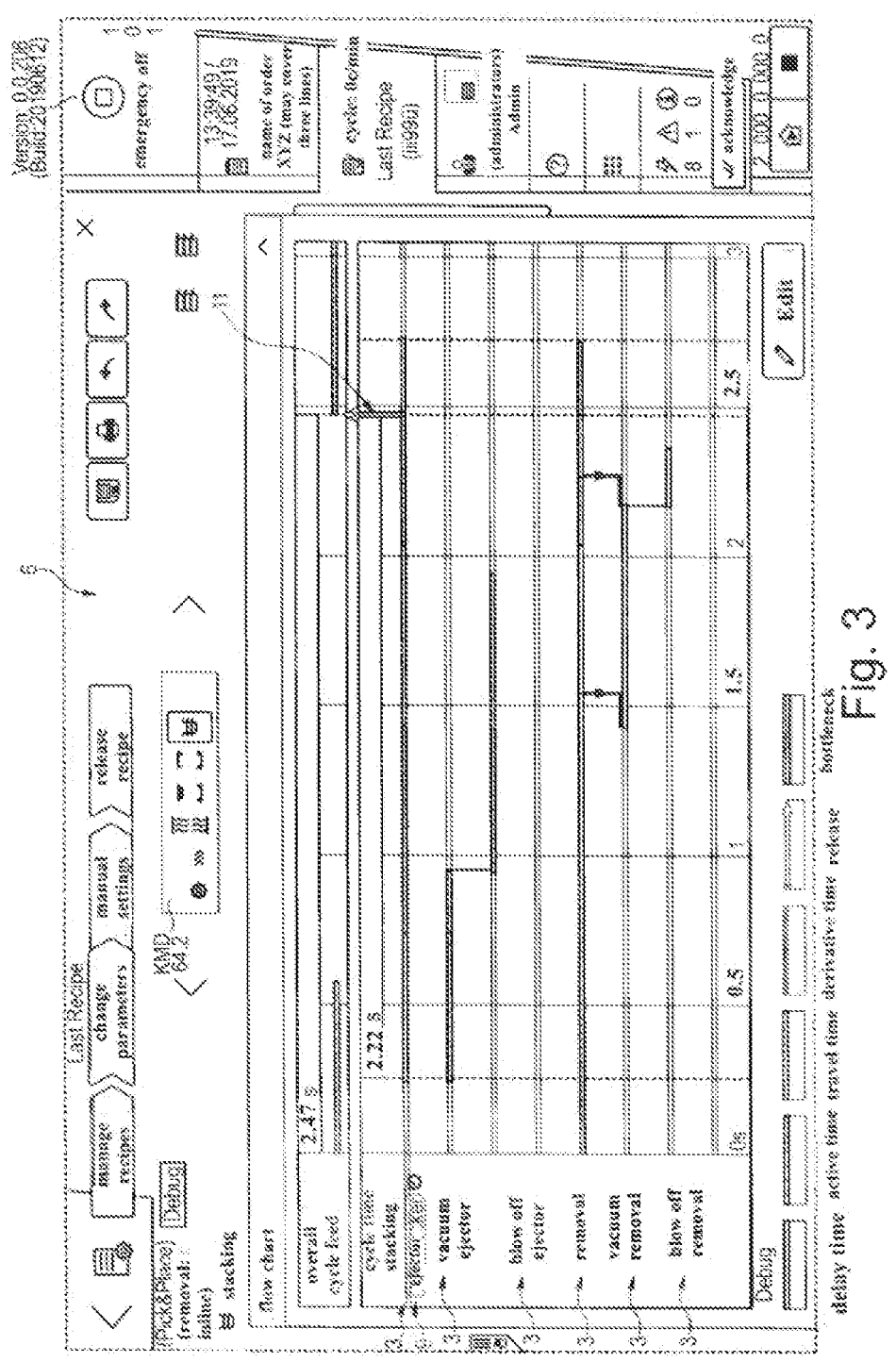
FIG. 3 an embodiment of the visualization of the machine components of a station on the visualization unit with a highlighted speed-determining machine component according to the present invention.

FIG. 3 shows an embodiment of the invention by visualizing the machine components 3 of the stacking station on the visualization unit 6 including highlighting of the ejector as the speed-determining machine component 9. Here it is additionally indicated by the vertical pointer 11 where the process sequence of stacking ends as a bar in the flow chart and thus the release for the start of the feed as the subsequent process takes place.

Figure 4:
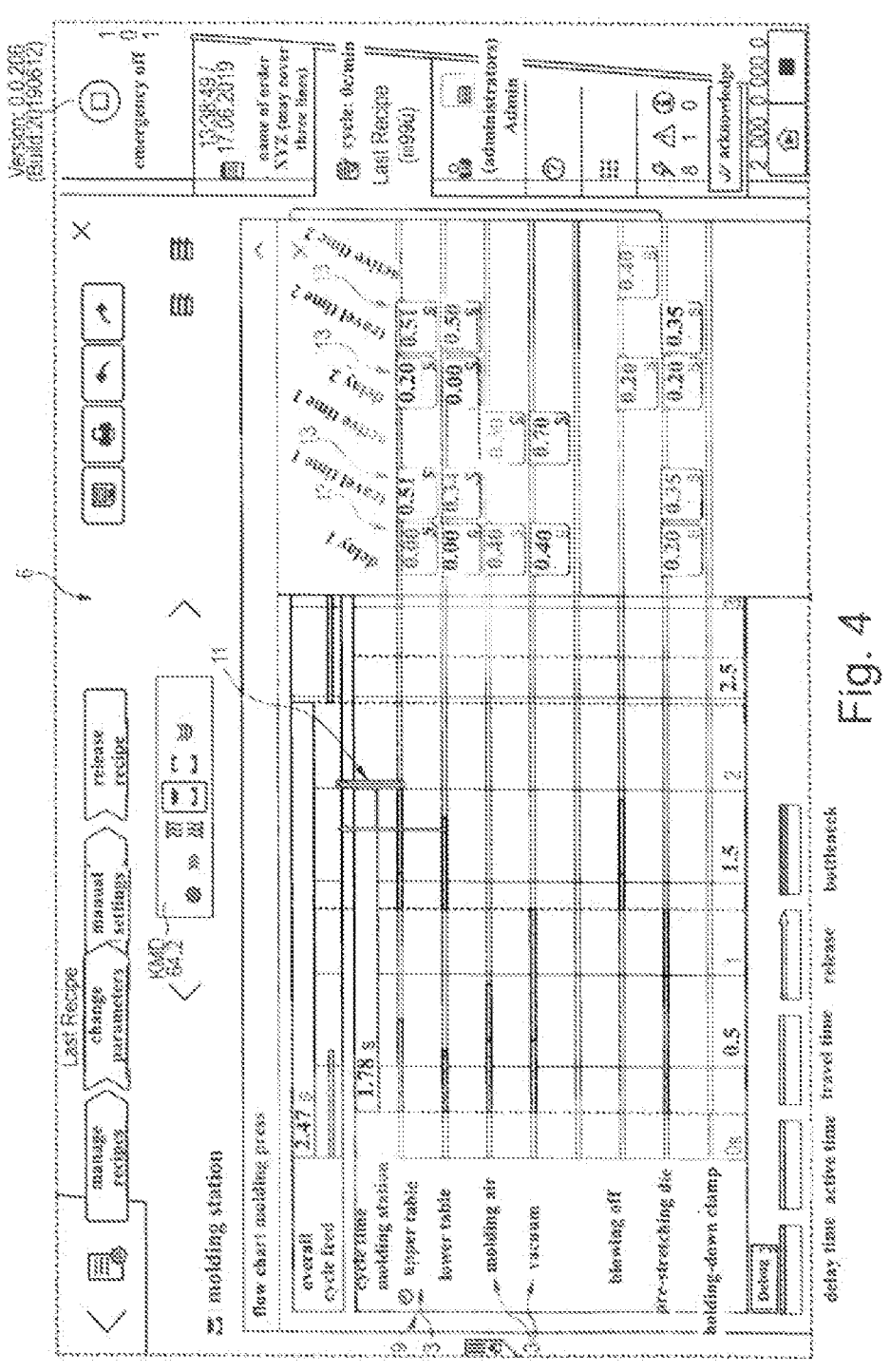
FIG. 4 an embodiment according to the present invention as shown in FIG. 3 with additionally displayed switch panels for the input of time values.

FIG. 4 shows an embodiment of the invention according to FIG. 3 with additional visualization of the switch panels 13 for entering new time values. The switch panels are arranged in the corresponding line of the associated machine component and show the individual time phases in the same sequence and the same colors typical of the time phases. A grouping according to time phase types takes place here column by column. In the lower right corner of each switch panel the respective time unit "s"
(=second) is indicated.

Figure 5:
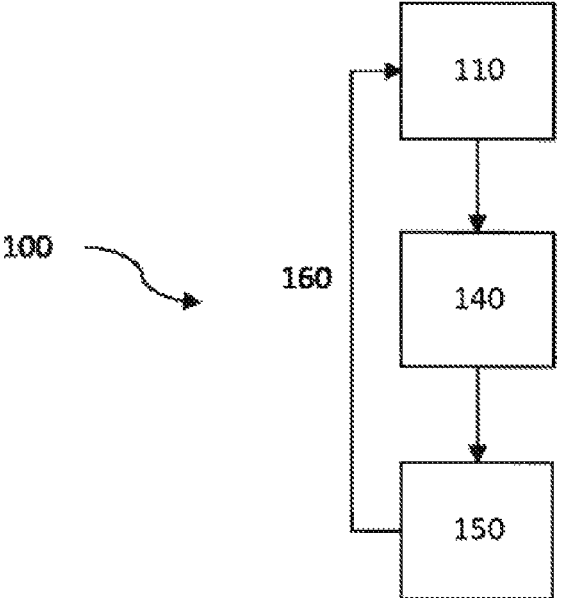
FIG. 5 an embodiment of the process according to the present invention in its presentation as a schematic flow chart.

FIG. 5 shows a flow chart for illustrating the method 100 according to the invention with the initial step 110 as visualization of at least one, preferably all, stations 2 and/or machine components 3 as a flow chart 7 highlighting the speed-determining station 8 and/or speed-determining machine component 9 with indication of the time phases 12 and provision of corresponding switch panels 13 for inputting time values in relation to the respective visualized station 2 or machine component 3 into the control program 5; followed by the step 140 of user input of one or more time values into the switch panels 13 and user release for transmission into the control program 5 with the resulting adaptation of the production program in the step 120 of recalculation of the production program in its time sequence based on the time value(s) input via the switch panels 13 in step 140. Optionally, the method steps 110, 140 and 150 can be executed again here according to 160 for further optimization.

At this point, it should be explicitly pointed out that features of the solutions described above or in the claims and/or figures can also be combined, if necessary, in order to be able to implement or achieve the explained features, effects and advantages in a correspondingly cumulative manner.

It is understood that the exemplary embodiment explained above is merely a first embodiment of the present invention. In this respect, the embodiments of the invention are not limited to this example.

LIST OF REFERENCE NUMBERS USED

1 Production machine, for example a thermoforming machine or a blow molding machine
2 Station
3 Machine component
4 Machine control
5 Control program
6 Visualization unit
7 Flow chart
8 Highlighted (because speed-determining) station
9 Highlighted (because speed-determining) machine component
10 Vertical line for visualizing a link between the speed-determining station (here stacking) and a subsequent process step (here feed)
11 Vertical pointer for visualizing a release as a speed-determining step of the upper table as a machine component, whereby the pointer points to the subsequent process step released by this (here feed)
12 Time phases
13 switch panel(s)
14 User aid
15 Separate station visualization page
16 Button for switching between individual station visualization pages
100 Method of optimizing the process time of a production machine
110 Visualization of a flow chart of at least some of the stations with indication of the speed-determining stations and speed-determining machine components together with visualization of switch panels for the input of changed time values
140 User input of one or more time values in the switch panel together with a command for transfer to the control program
150 Adjustment of the production program on the basis of the varied time values
160 Renewed (optionally automated) execution of the method steps for further optimization of the process time

The invention claimed is:

1. A production machine comprising one or more stations, each comprising a plurality of machine components, and a machine controller for controlling the production machine comprising a control program with a visualization unit, wherein the control program is designed to display the stations and/or the machine components of a station as a flow chart on the visualization unit and to highlight a speed-determining station and/or a speed-determining machine component, wherein the visualization unit is set up as an interactive user interface;

the control program is additionally designed to display, after one or more new time values have been entered and accepted into the control program on the visualization unit, a new flow chart based thereon; and the highlighting of the speed-determining station and/or the speed-determining machine component is effected by one or more of the following visualization types:

(i) a line perpendicular to a t-axis of the flow chart, which touches a bar of the speed-determining station or the speed-determining machine component at a t-value at which the bar of the station or the machine component ends in the flow chart; or (ii) (ii) visual highlighting of links already present in the flow chart, wherein the links include a pointer linking an end of a first speed determining process step to a start of a second process step and defining a release;

wherein process time for the production machine is optimized based on the highlighting of the speed-determining station and/or the speed-determining machine component.

2. The production machine according to claim 1, wherein the control program is additionally adapted to display on the visualization unit the time phases of process sequences carried out by the machine component.

3. The production machine according to claim 2, wherein the time phases are assigned to a specific time phase type.

4. The production machine according to claim 1, wherein the visualization unit is set up as a touchscreen.

5. The production machine according to claim 4, wherein the control program is additionally adapted to provide a user aid on the visualization unit.

6. The production machine according to claim 4, wherein the control program is additionally adapted to display on the visualization unit switch panels for inputting time values for the time phases of process sequences carried out by the machine component, one or more of the following visualization types being provided:

the switch panels are displayed in a separate window, the switch panels of a machine component are arranged in the corresponding line of the machine component, the sequence of the switch panels within a line corresponds to the sequence of the time phases of the machine component which is controlled thereby, the switch panels are grouped by time phase type in columns, the switch panels are represented in the same colors as the time phase types of the flow chart, the switch panels are each provided with or linked to an indication of the respective time unit, the switch panels are each provided with or linked to a time value suggested by the control program, the switch panels are provided with or linked to a limit value for a smallest possible time value, the switch panels are each provided with or linked to a range of possible time values, for the speed-determining machine component, the switch panel(s) is/are visually highlighted that have a time value to be shortened for a time reduction of a machine component sequence, the switch panels are each provided with or linked to different optimization strategies which, propose one or more of a maximum time reduction, a medium time reduction or a slight time reduction as alternatives and enable automatic recalculation of the program after selection of an optimization strategy independently of precise user input of values.

7. The production machine according to claim 1, wherein the control program provides a separate visualization page on the visualization unit for each visualized station, suitable switch panels being provided for switching between individual station visualization pages.

8. The production machine according to claim 1, wherein the control program is adapted such that the recalculation of the production program and the visualization of the speed-determining station and/or the speed-determining machine components are carried out based on input of new time values into the respective switch panels without real operation of the production machine.

9. Method of optimizing the process time for a production machine comprising a plurality of stations and/or machine components and a machine controller for controlling the production machine comprising a control program with an interactive user interface designed as a visualization unit, comprising the following steps:

(A) Visualizing at least one station and/or machine component as a flow chart including highlighting of speed-determining station and/or a speed-determining machine component with indication of time phases and providing corresponding switch panels for inputting time values with regard to the respectively visualized station or machine component into the control program;

(B) Input of one or more time values into the switch panels and release by the user for transmission to the control program;

(C) Calculating the production program in its time sequence based on the time value(s) entered via the switch panels in step (B);

wherein the control program is additionally designed to display, after one or more new time values have been entered and accepted into the control program on the visualization unit, a new flow chart based thereon; and the highlighting of the speed-determining station and/or the speed-determining machine component is effected by one or more of the following visualization types:

(i) a line perpendicular to a t-axis of the flow chart, which touches a bar of the speed-determining station or the speed-determining machine component at a t-value at which the bar of the station or the machine component ends in the flow chart; or (ii) visual highlighting of links already present in the flow chart, wherein the links include a pointer linking an end of a first speed determining process step to a start of a second process step and defining a release;

wherein process time for the production machine is optimized based on the highlighting of the speed-determining station and/or the speed-determining machine component.

10. Method according to claim 9, wherein the control program is additionally adapted to display on the visualization unit the time phases of process sequences carried out by the machine component.

11. Method according to claim 10, wherein the time phases are assigned to a specific time phase type.

12. Method according to claim 9, wherein the control program is additionally adapted to provide a user aid on the visualization unit.

13. Method according to claim 9, wherein the control program is additionally adapted to display on the visualization unit switch panels for inputting time values for the time phases of process sequences carried out by the machine component, one or more of the following visualization types being provided:

the switch panels are displayed in a separate window, the switch panels of a machine component are arranged in the corresponding line of the machine component, the sequence of the switch panels within a line corresponds to the sequence of the time phases of the machine component which is controlled thereby, the switch panels are grouped by time phase type in columns, the switch panels are represented in the same colors as the time phase types of the flow chart, the switch panels are each provided with or linked to an indication of the respective time unit, the switch panels are each provided with or linked to a time value suggested by the control program, the switch panels are provided with or linked to a limit value for a smallest possible time value, the switch panels are each provided with or linked to a range of possible time values, for the speed-determining machine component, the switch panel(s) is/are visually highlighted that have a time value to be shortened for a time reduction of a machine component sequence, the switch panels are each provided with or linked to different optimization strategies which, propose one or more of a maximum time reduction, a medium time reduction or a slight time reduction as alternatives and enable automatic recalculation of the program after selection of an optimization strategy independently of precise user input of values.

14. Method according to claim 9, wherein the control program provides a separate visualization page on the visualization unit for each visualized station, wherein suitable buttons are provided for switching between individual station visualization pages.

15. Method according to claim 9, wherein the recalculation of the production program and the visualization of the speed-determining station and/or the speed-determining machine component based on input of new time values into the respective switch panels are performed without real operation of the production machine.

\* \* \* \* \*